(12) United States Patent
White et al.

(10) Patent No.: US 9,253,631 B1
(45) Date of Patent: Feb. 2, 2016

(54) LOCATION BASED FUNCTIONALITY

(75) Inventors: Jeffrey A. White, Seattle, WA (US); Charles B. Zapata, Redmond, WA (US); Timothy Youngjin Sohn, Mountain View, CA (US); Adriana Moscatelli, Normandy Park, WA (US)

(73) Assignee: Amazon Technologies, Inc., Reno, NV (US)

( * ) Notice: Subject to any disclaimer, the term of this patent is extended or adjusted under 35 U.S.C. 154(b) by 297 days.

(21) Appl. No.: 13/432,851

(22) Filed: Mar. 28, 2012

(51) Int. Cl.
*H04W 12/02* (2009.01)
*G06Q 30/06* (2012.01)
*G06F 21/84* (2013.01)

(52) U.S. Cl.
CPC ........... *H04W 12/02* (2013.01); *G06Q 30/0631* (2013.01); *G06F 21/84* (2013.01)

(58) Field of Classification Search
CPC ... G06Q 30/02; G06Q 20/12; G06Q 30/0207; G06Q 30/0211; G06Q 30/0208; G06Q 30/0226; G06Q 30/0233; G06Q 30/0235; G06Q 30/0239; G06Q 30/0269; G06Q 30/0271; G01C 21/3685; G09B 29/006; H04L 65/604; H04N 21/41407; H04N 21/452; H04W 12/02; H04W 12/04; H04W 52/0258; G06F 21/84

USPC .............. 455/456; 370/338; 705/14.4, 50–52; 709/220, 226, 201; 375/141
See application file for complete search history.

(56) References Cited

U.S. PATENT DOCUMENTS

| | | | |
|---|---|---|---|
| 2006/0112428 A1* | 5/2006 | Etelapera ........................ 726/16 |
| 2006/0293065 A1* | 12/2006 | Chew et al. ................ 455/456.3 |
| 2008/0225810 A1* | 9/2008 | Buchwald et al. ............ 370/338 |
| 2010/0004003 A1* | 1/2010 | Duggal et al. ............ 455/456.3 |
| 2013/0124276 A1* | 5/2013 | Brown ......................... 705/14.4 |
| 2013/0254028 A1* | 9/2013 | Salci .......................... 705/14.53 |
| 2013/0304878 A1* | 11/2013 | Russell ......................... 709/220 |

\* cited by examiner

*Primary Examiner* — Nizar Sivji
(74) *Attorney, Agent, or Firm* — Novak Druce Connolly Bove + Quigg LLP

(57) ABSTRACT

Various approaches provide for the delivery of information on a portable computing device in response to being at or near a particular geographic location. In addition, optional functionality associated with the information can also be provided. In various embodiments, one or more applications are available to a user for download. The applications could come prepackaged with the device. It can be beneficial to monitor the user of the portable computing device to learn a user's habits. Understanding a user's habits, along with their stated preferences, allows a service to provide a user with timely and relevant information that is not only relevant to the user, but also relevant to the user's current location.

24 Claims, 7 Drawing Sheets

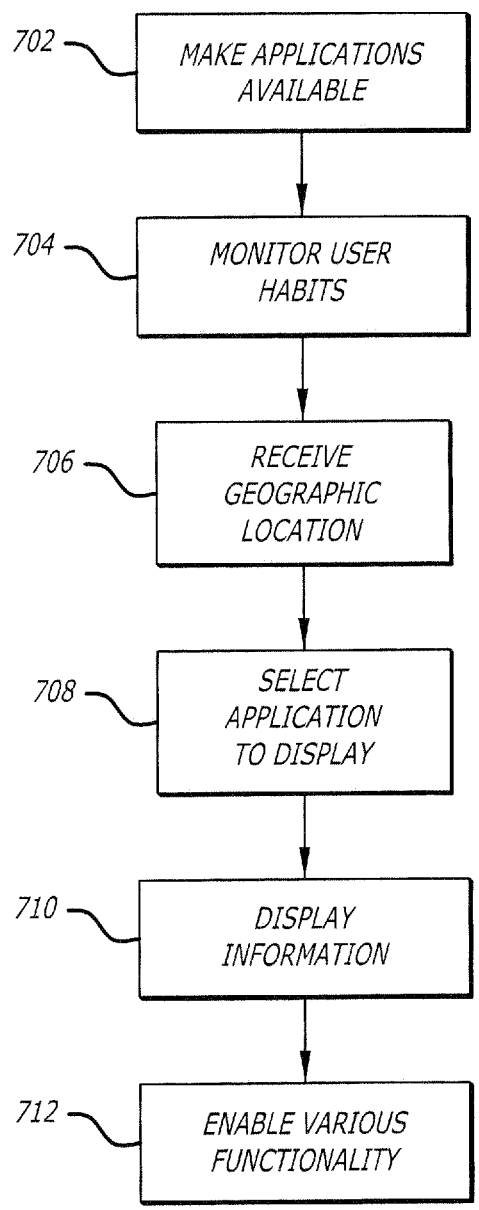

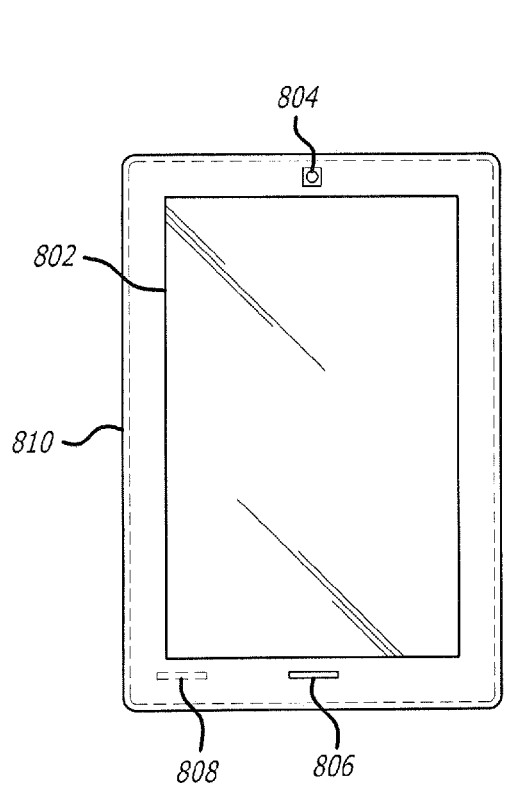
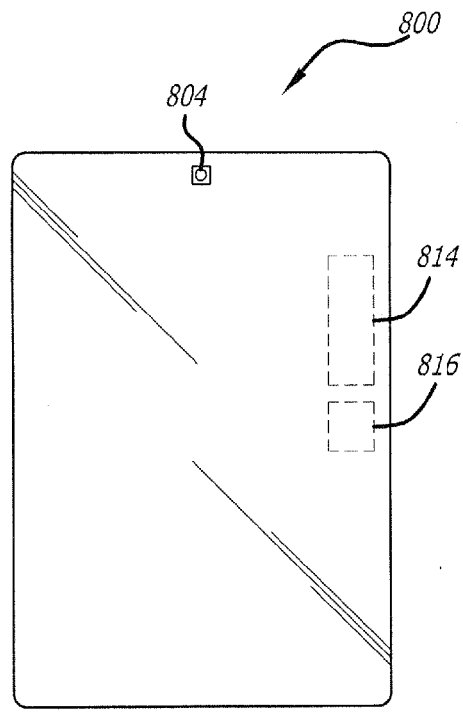
FIG. 8A    FIG. 8B
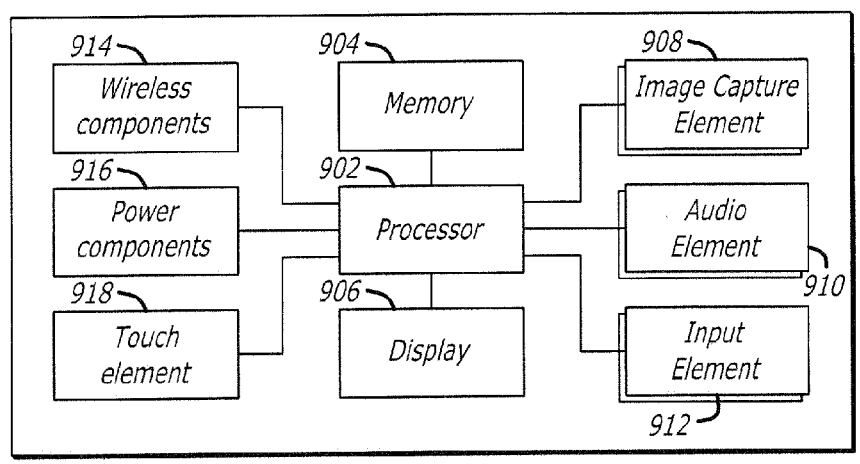
FIG. 9

LOCATION BASED FUNCTIONALITY

BACKGROUND

Content providers are ever trying to figure out ways to offer users more timely and relevant information as people are increasingly using portable computing devices in more areas of their lives. Conventional mechanisms that provide users with information have been limited by the amount of data those systems are able to gather, transmit, and process in a short time. As the rate of data available increases and is able to be transmitted and processed increases, it can be advantageous to adapt not just the ways in which information is delivered, but also what information is delivered, when this information is delivered, and where this information is delivered to these devices.

BRIEF DESCRIPTION OF THE DRAWINGS

Various embodiments in accordance with the present disclosure will be described with reference to the drawings, in which:

FIG. 7 illustrates an example process for providing location based information on a computing device in accordance with various embodiments;

FIGS. 8A and 8B illustrates front and back views of an example portable computing device that can be used in accordance with various embodiments;

FIG. 9 illustrates example components of an portable computing device that can be used in accordance with various embodiments.

DETAILED DESCRIPTION

Figure 1:
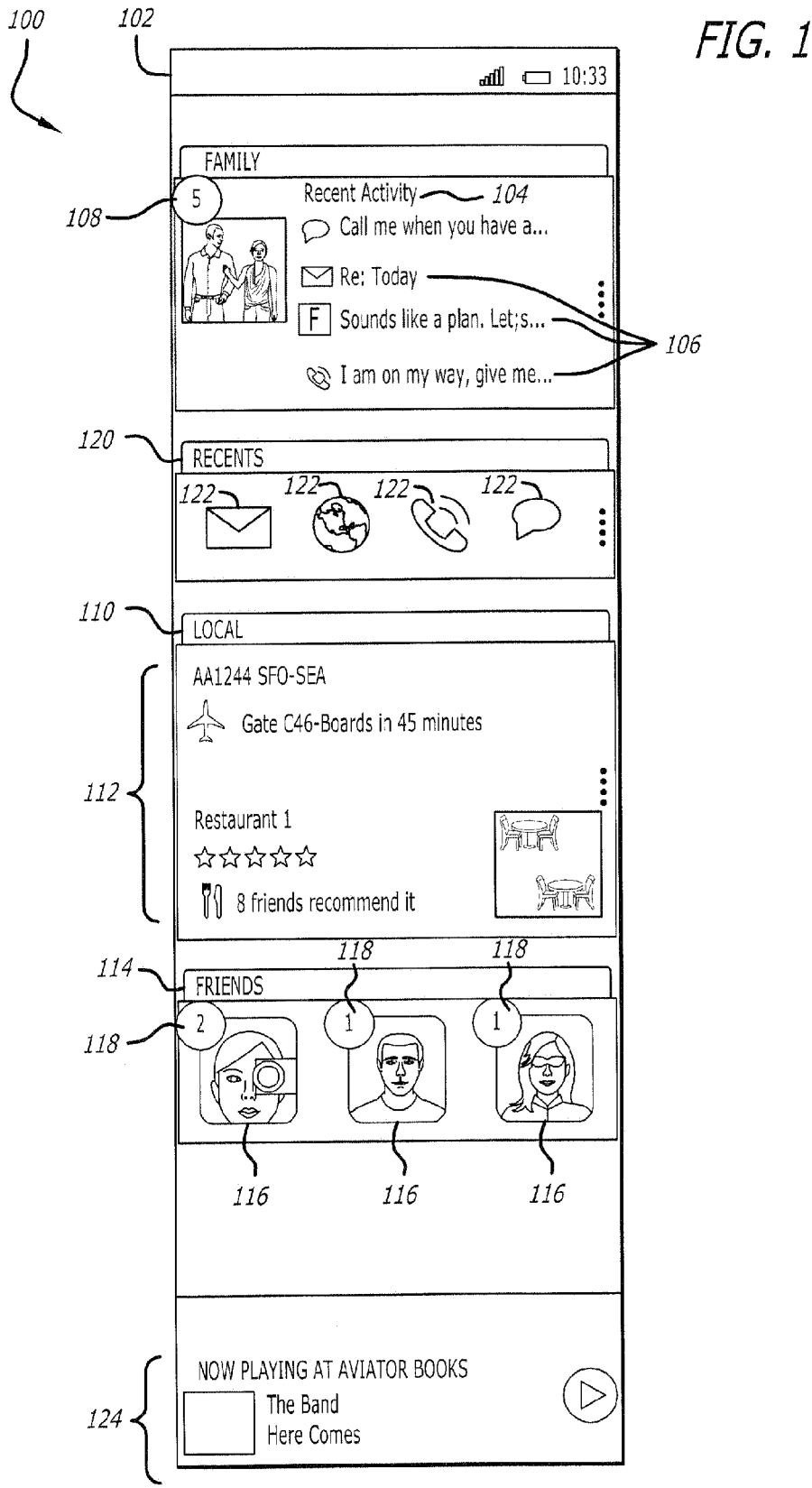
FIG. 1 illustrate an example home screen on a portable computing device in accordance with various embodiments.

Systems and methods in accordance with various embodiments of the present disclosure may overcome one or more of the aforementioned and other deficiencies experienced in conventional approaches to managing content delivery and/or functionality on a portable computing device. In particular, various embodiments enable different information and/or functionality to be available to a user based at least in part upon a current location of the user. For example, a portable computing device can present various screens, such as lock screens and home screens, that are capable of including one or more widgets or icons representing various functions or applications. The widgets can display information relating to particular subject matter, and can enable users to access additional information or activate functionality related to that subject matter. In some embodiments, the subject matter presented at any given time can be particular to the current location of the portable computing device.

Various approaches provide for the automatic launching of applications or activation of functionality, as well as the delivery of certain types of information by already running applications, on a portable computing device in response to being at or near a particular geographic location, near a specific type of establishment, or near a particular user or object. Various approaches also enable a user to access optional functionality associated with the location, etc. In various embodiments, one or more widgets or icons representing applications are preinstalled on a device or made available to a user for download. The applications themselves also can be prepackaged as part of the device, embedded as part of the device's operating system, or downloaded/installed by a user. Once available, the applications can be displayed on a screen, page, or other interface region of a portable computing device. Each such application, widget, or module can display at least one particular type of information. For example, a time application can display information related to current time at one or more locations, a sports application can display information related to sports news and highlights, and so on.

It can be beneficial to monitor the user of the portable computing device to learn a user's habits, such as what, where, and how often the user likes to eat and shop; how often the user travels or is on the road; and which people the user communicates with most often. Knowing this information, along with the user's stated preferences and current location, can allow a service or application to provide the user with timely relevant information; ideally, the right information at the right time and place.

Accordingly, at least one service in accordance with various embodiments monitors the user's habits and location through one or more user devices. A user subscribed to such a service can have at least one portable computing device that includes a location determining capability (e.g., GPS, Wi-Fi triangulation, etc.) and is at least periodically in communication with at least one computer system or network of the service. In various embodiments, the portable computing device will regularly send the computer system data associated the user's location. In response to receiving data associated with the user's location, the computer system can select certain information for a particular application to display that is relevant to the user based on the user's current geographic location and/or habits.

In some embodiments, the presentation of information is interactive and different types of functionality can be offered, as may be based on whether the portable computing device is in a lock-screen state or mode or in an unlocked state or mode. For example, a news flash or notification could be displayed while in a locked screen mode. If the user is interested in reading more about the news flash, the user could perform some action, such as to triple tap a banner notification, for example, to be taken to the full story associated with the news flash without unlocking other functionality of the device. In one example, the notification could alert the user of receipt of an email and allow the user to perform an action to unlock an email application and respond to the email without unlocking other functionality of the device. This example could also be extended to text messages, instant messaging, accepting an invitation, accepting a friend request, accepting a coupon for a business in close proximity, making a reservation at a restaurant, checking a wait time for a table at a restaurant, and the like. In another example, the notification could be alert the user of a restaurant a friend has written a positive review about, a restaurant the user frequents, or a suggestion to try a particular restaurant in close proximity based on the user's habits or positive reviews by other users or publications. In another example, the notification could be a social networking application and a notification could alert the user of people the user is friends with through the social networking application or platform that are in close proximity. The device could also be in communication with a gaming center server for notifying a user of friend's video game achievements such as new high score and advancement to new levels.

Various other applications, processes and uses are presented below with respect to the various embodiments.

FIG. 1 illustrates an example home screen 100 that includes location based functionality in accordance with one embodiment. Home screen 100 includes a utility bar 102 and one or more category feeds including a family feed 104, a local feed 110, and a friends feed 114. The family feed 104 could include a live feed of recent activity 106 from a user's family members. The recent activity 106 may include recent text messages, emails, status and activity updates, missed calls, and other such services. For example, a user's address book may include an option to identify each contact with a particular group, such as family, friend, work, and so on and include various fields for inputting various service accounts associated with the particular contact. The user could, for example, identify an email account, a phone number for calling and text messaging, and various social networking accounts such as Twitter®, Facebook®, LinkedIn®, etc. or other services that include social networking aspects such as Yelp®, Urbanspoon®, MapMyRun®, Instagram®, and the like to associated with a particular contact. Associating these accounts with the particular contact could allow the device to pull or be pushed information regarding activity on these accounts for display on home screen 100 under the family feed 104. FIG. 1 also shows, for example, an updates notification 108 that could indicate the number of unviewed activity updates, messages, emails, calls, and so on from people in the user's family. In one instance, the family feed 104 could additionally display a notification when a family member is in close geographic proximity, depending on the services the family member is subscribed to, to allow the user to contact or meet up with the family member.

Similarly, a user could identify a contact as a friend in the address book and associate the friend with some of the service accounts described above to have the contact's activity on these accounts displayed on home screen 100 under the friends feed 114. The friends feed 114 includes one or more friends 116 and include notification updates 118 with respect to the friends 116 as described above for the notifications 108. It is often the case that a user does not have contact information for each person the user is associated with through a social network, therefore, in some embodiments, the friends feed 114 could be in direct communication with a social network or other service for providing and displaying the activity information. In one instance, the user could designate favorite friends to subscribe to all of their activity or to unsubscribe for receiving activity from a friend who lives in another country, for example. In another instance, the activity could be location specific, such that the friends feed 114 prioritizes activity from friends who are closest in geographic proximity to the user. Other notifications could include a notification that a friend is across the street at XYZ books or at the corner coffee shop, which would be particularly useful when traveling or visiting a different city.

Also shown in FIG. 1, local feed 110 includes information about a user's current geographic location. Ideally, local feed 110 includes information that is relevant to the user's general current location. Information of the user's current location could be very specific information, such as the location of the user within a few blocks or near a specific address or more general, such as the city a user is currently in. In the current example, the local feed 110 includes notifications 112. The notifications 112 include flight information corresponding to an upcoming flight and information regarding a restaurant in close proximity that a few of the user's friends, though at least one social network, have recommended. In this example, the device knows the user is currently in an airport (e.g., by using GPS, Wi-Fi, triangulation, etc.) and has pulled information from the user's email, for example, indicating the flight and gate number, boarding time, and so on. In one instance, the device could pull information for a text message, a calendar event, or any other data source accessible to the device. In another instance, the device can automatically check the status of the flight without user intervention, such as by consulting the airlines webpage, to notify the user of any changes to the flight's details and even alert the user to changes. In another instance, the user could manually input the flight information into the device. The restaurant notification, in this example, corresponds to a restaurant in the airport that a few of the user's friends through various social networks recommended. In one instance, if the restaurant is a chain, the user's friends may not have recommended this particular location in the airport, but such information could still be of interest to the user in the event the user is looking for somewhere to eat. In another example, the device, or other system in communication with the device, could monitor the user's habits, the type of food the user eats most often, and the restaurants, or other businesses, the user frequents. The device could then suggest restaurants, or other businesses, in close geographic proximity that the user is likely to enjoy in real-time. For example, a user who frequents nice and expensive Italian restaurants visiting Los Angeles from New York City might be walking down the Venice Boardwalk and receive a notification suggesting that the user try the Italian restaurant Piccolo. The notification could say something like "Because you frequent Italian restaurants like . . . , you would probably enjoy Piccolo" and provide the user with the exact location of Piccolo. This suggestive example could also be extended to other businesses such as surf shops, organic food grocery stores, Irish Pubs, and so on. In another example, a user who goes to Starbucks® each morning, and often in the afternoon, may be traveling and receive notifications each time the user is close to a Starbucks®. In one instance, the device or system may know where the user is geographically, but not know anything particularly interesting about the specific location. The device or system, however, might know something broadly. For example, a user might be driving though California's Death Valley on the way to Arizona. Since there isn't anything in Death Valley, the local feed 110 could display an image having meta data therein identifying it as an image of Death Valley. Alternatively, the local feed 110 could pull information, such as a summary from Wikipedia®, and display it to the user, for example.

As part of monitoring the user's habits, the portable computing device in at least some embodiments can log data regarding the information or functionality that the user has accessed, inquired about, clicked on, or provided input to receive additional information or functionality. This information can then be used for purposes such as to infer a user's interest in various items, topics, businesses, subject matter, news alerts, locations, establishments, events, and the like.

In addition, the home screen 100 can include a 'Recents' bar 120 that can include one or more recent items 122 such as an email icon or widget, call function icon, text message icon, or any other application recently used by the user. The home screen 100 can also one or more other applications such as music application 124. The music application, in this example, could selectively be in a constant listening mode, or a listening mode when activated by a gyroscope or accelerometer, to identify music playing in the background or within ear-shot of the device. Accordingly, a user could choose many different category feeds, applications, and/or widgets to have regularly displayed on the home screen.

In various embodiments, a widget can comprise an embeddable chunk of code that refers to, or is associated with, a stand-alone application or other software module embedded in a webpage, blog, profile, an operating system on a device, and the like. Widgets, in various instances, can be downloadable applications which may look and act like traditional applications but are typically implemented using various web technologies such as JavaScript, Flash, HTML, CSS, and the like, for example. A widget can allow a user to turn personal content into web applications such as, for example, a weather widget that reports current weather by accessing data from the Weather Channel®, which could be sponsored by the Weather Channel®.

Figure 2:
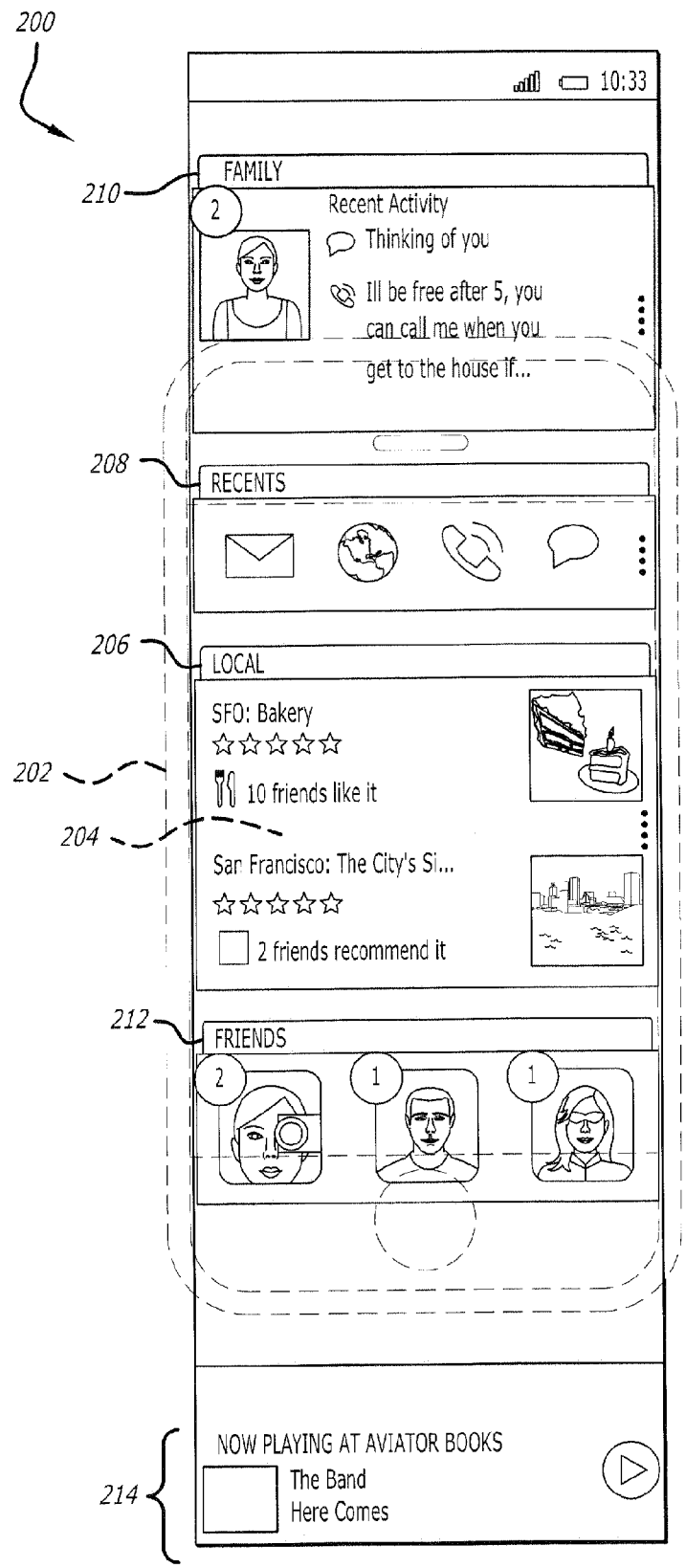
FIG. 2 illustrates another example home screen on a portable computing device in accordance with various embodiments.

FIG. 2 illustrates an example of a home screen 200 that includes location based applications and a portable computing device 202 in phantom. The home screen 200 includes a local feed 206, a family feed 210, a friends feed 212, a 'Recents' bar 208, and a music application 214 that are substantially similar to the applications and category feeds described in FIG. 1, The portable computing device 202, in this example, includes a screen 204 and is provided in phantom to illustrate a scrollable functionality of the home screen 200. The computing device 202, in this example, includes a touch screen which enables a user to scroll up and down the home screen 200 with a swipe of one or more fingers.

Information from an electronic address book, a collection of data records providing contact information for a plurality of people or entities (such as businesses or, generally, organizations), may be used to provide a user with location specific information to a home screen, such as home screen 100 and 200, that is relevant to the user's preferences and habits. The address book may be from one or more different places, such as from the device 202, from a data store of a server, such as a mail or web server, from a list of contacts used in connection with a social networking website, and the like.

Information regarding locations or businesses the user has visited may also be used to provide information suggest additional locations or businesses that may be of interest to the user. In accordance with an embodiment, various criteria can be used to determine when information should be displayed to a user for a particular location. As an example, a user traveling with his or her device, locations he or she visits may be recorded in order to determine other potential locations or businesses of interest. While examples of various embodiments in the present disclosure, for the purpose of illustration, use examples of GPS data from GPS-enabled devices, locations may be recorded using other devices and/or techniques in addition to or as an alternative to recording GPS data from a UPS-enabled device. For example, cellular tower triangulation, radio frequency identification (RFID) locating techniques, geolocation techniques using Internet protocol (IP) addresses, geolocation techniques using wireless fidelity (Wi-Fi) communication devices, and generally any technique that can be used to identify locations may be used and appropriate data associated with the technique or derived from data associated with the technique may be recorded.

Figure 3:
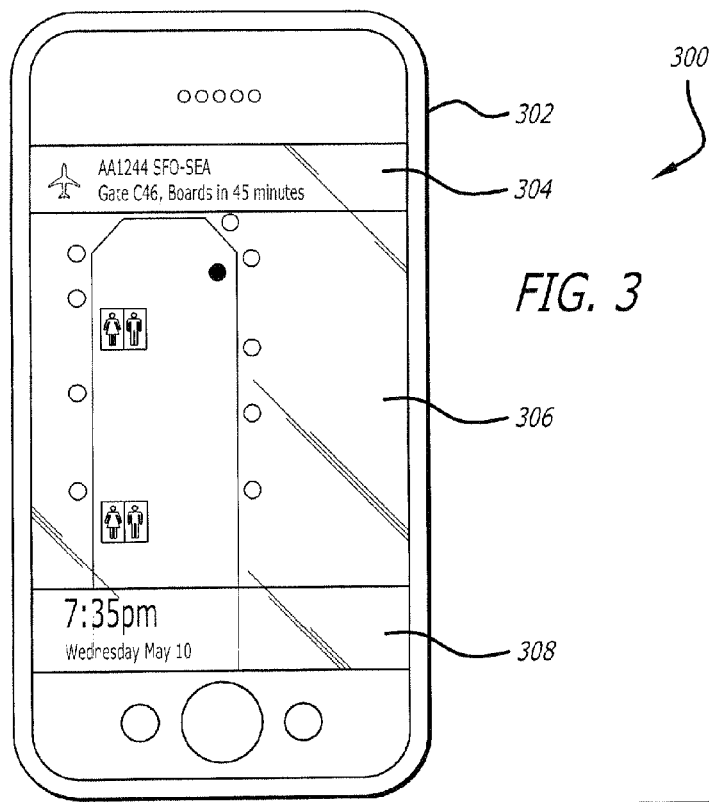
FIG. 3 illustrates an example lock screen on a portable computing device in accordance with various embodiments.

In various embodiments, location based applications and/or functionality can be provided to a portable computing device in a locked-screen state or mode utilizing many of the same techniques described above. For example, FIG. 3 illustrates example lock screen 300 that includes a location based application on a portable computing device 302. The device 302 of FIG. 3 includes an information bar 304 that can display information relating to the phone, such as battery life, reception, missed call notifications, text messages, news flashes, and the like, and also may include information of the application or functionality currently being displayed to the user. There is a content display or screen 306, and a utility bar 308 that may include information such as the date and time, but also, or alternatively, may include missed call notifications, text messages, news flashes, and the like as well. In this example, the user is in an airport and the screen 306 is displaying a map of the airport that indicates the current location of the user, the user's gate information, the time left before boarding, and other information that may be relevant to the user such as the location of bathrooms, restaurants, coffee shops, and so on. In this instance, the device 320 can realize or identify a user's location and search the internet, for example, for relevant information to locate a map of the airport. As described above for FIG. 1, the device 302 may know the user's flight information from an email, a calendar event or reminder, the information could have been manually inputted by the user, and so on.

Figure 4:
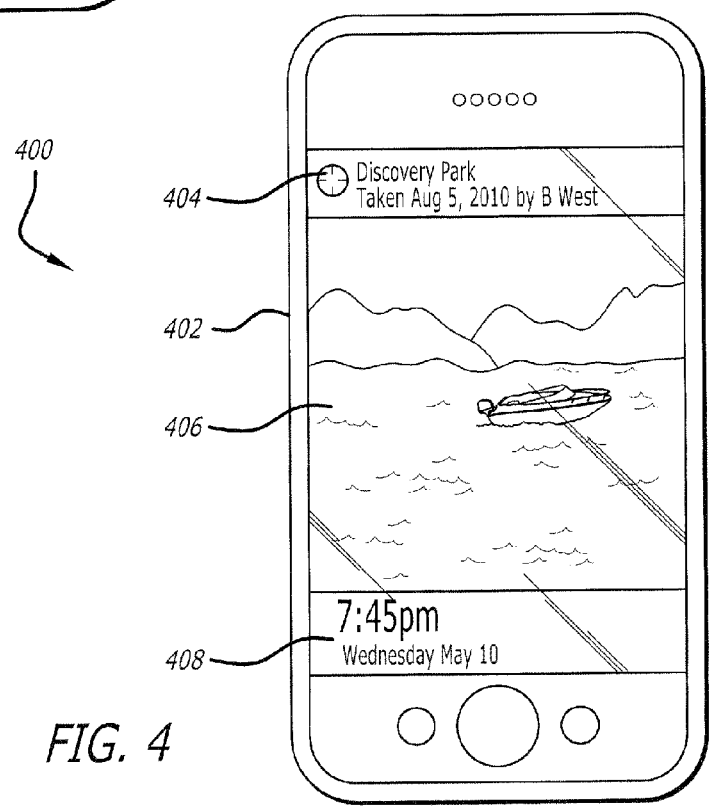
FIG. 4 illustrates an example lock screen on a portable computing device in accordance with various embodiments.

In another example, FIG. 4 illustrates example lock screen 400 that includes another example of a location based lock screen application on a portable computing device 402. The device 402 includes an information bar 404 that can display information relating to the phone, such as battery life, reception, missed call notifications, text messages, news flashes, and the like as described above, and can also include information of the application or functionality currently being displayed to the user. There is a content display or screen 406, and a utility bar 408 that will include information substantially similar to that described above for FIG. 3. FIG. 4 illustrates an example described above for the home screen, where the device or system knows the user's geographical location, but does not know anything particularly interesting or anything that is relevant to the user about the specific location, but might know something broadly. In this example, the user is at or near Discovery Park and the device has displayed a landscape image of Discovery Park. As described above, the device 402 identifies the user's location and searches the internet, for example, for relevant information. In this example, the device 402 does not find anything particularly relevant to the user, but has searched the internet for Discovery Park and identified one or more digital images containing meta data indicating that the images are landscapes of Discovery Park and displays an image, an array of images, or a slide show of images, for example. In one instance, the device could display text with the images such as "The Happiest Place of Earth" for a user at Disneyland® and "Welcome to the Windy City" for a upon entering Chicago. In another instance, the device, or service provider, could pull weather information from a database of a weather forecasting service and display text or images relating to current weather conditions. For example, the device could be programmed to know that the weather in San Francisco rarely gets above 70 degrees Fahrenheit, so when the device pulls data indicating it is an 80 degree day, the device could display something like "Today would be a great day to go to the beach." In this instance, the device could also display an image of a sunny day in San Francisco. Likewise, a device collecting user habit data might know that the user leaves the house each morning at 8:30 am to go to work and, when it's cold and rainy, the device could display a rainy image of San Francisco and display "Don't forget your umbrella today" at 8:20 am to alert the user of the weather outside.

Figure 5:
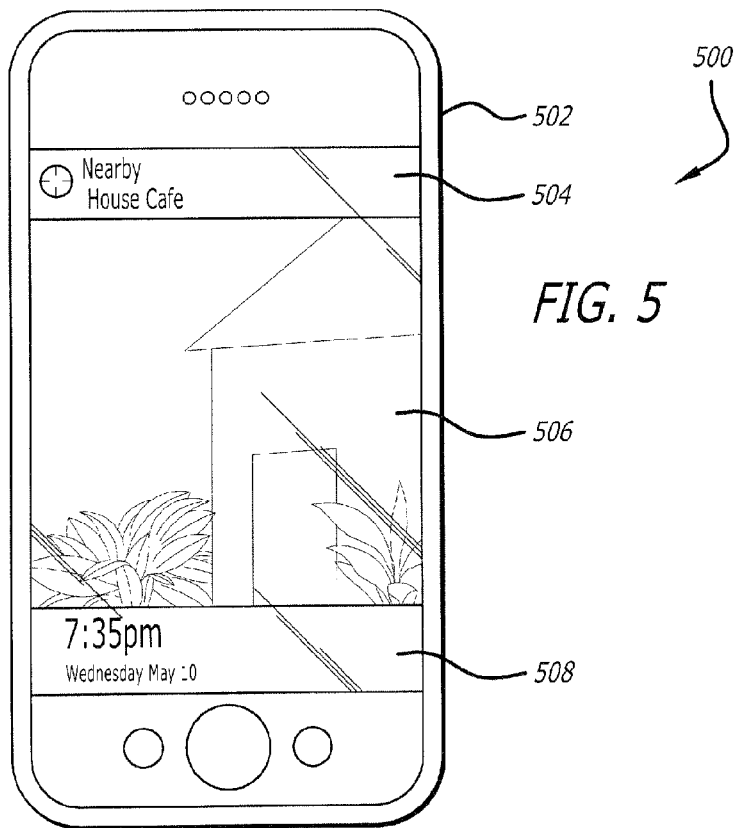
FIG. 5 illustrates an example lock screen on a portable computing device in accordance with various embodiments.

FIG. 5 illustrates example lock screen 500 that includes another example of a location based lock screen application on a portable computing device 502. The device 502 includes an information bar 504 that can display information relating to the phone, such as battery life, reception, missed call notifications, text messages, news flashes, and the like as described above, and can also include information of the application or functionality currently being displayed to the user. There is a content display or screen 506, and a utility bar 508 that will include information substantially similar to that described above for FIGS. 3 and 4. In this example, the device 502 is displaying information regarding a restaurant within close proximity to a user. The user could be walking or driving down a street, for example, and be alerted to the location of a restaurant that might be of interest to the user. For example, a user could be travelling and be alerted to a chain restaurant the user frequently eats at while at home. In one example, the device 502 could display information about a nearby restaurant that one or more of the user's friends though a social network frequent. The device 502, or service provider, could count the number of the user's friends, through a social network such as Facebook®, who have "checked-in" at a particular restaurant and at what frequently. A large number of friend "check-ins" at a high frequency being indicative of a high relevance to the user. The device 502 or service provider could also take into account restaurant reviews written by the user's friends though a social network or through an application with social networking capabilities, such as the Yelp® application, for example. If a friend of the user gave a restaurant near a user's current location a good review, the device 502 could display that information with the location of the restaurant. In another example, the device 502, or other system in communication with the device 502, could monitor the user's habits, the type of food the user eats most often, and the restaurants, or other businesses, the user frequents. The device 502 could then suggest restaurants, or other businesses, in close geographic proximity that the user is likely to enjoy as described above for FIG. 1. In various embodiments, information data such as images, points of interest, restaurants, landmarks, retail stores, friends, and so on could be pulled from data stored on device 502, a remote storage server, internet and/or phone service provider, third party service provider databases such as Facebook®, Flickr®, Picasa®, Google Maps®, any other data source, and so on. In another example, a user could be notified of a restaurant in close proximity and provide an action to make a reservation for later in the day, check to see if they currently have tables available or how long of a wait there is to be seated, or accept a coupon or other promotion. The action to unlock or access these features could be to tap three times, any number of times, makes a pattern with a finger on a touchscreen, say a voice command, enter a passcode, and so on.

Figure 6:
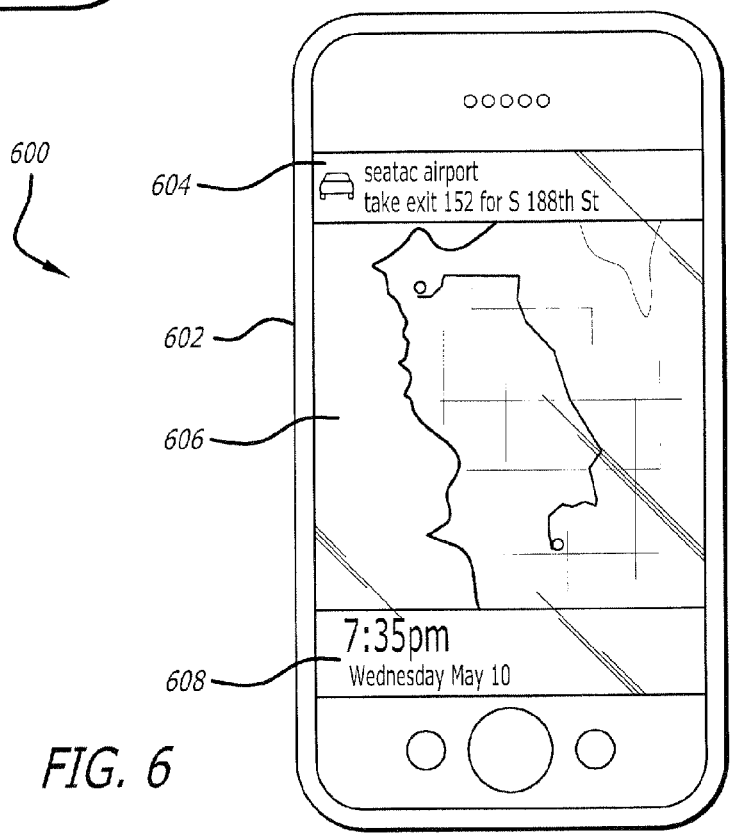
FIG. 6 illustrates an example lock screen on a portable computing device in accordance with various embodiments.

FIG. 6 illustrates example lock screen 600 that includes another example of a location based lock screen application on a portable computing device 602. The device 602 includes an information bar 604 that can display information relating to the phone, such as battery life, reception, missed call notifications, text messages, news flashes, and the like as described herein, and can also include information of the application or functionality currently being displayed to the user. There is a content display or screen 606, and a utility bar 608 that will include information substantially similar to that described above for FIGS. 3, 4, and 5. In this example, the device 602 is displaying a map and providing directions. In one instance, the lock screen 600 could be initiated by making a voice command such as speaking the location or address out loud to the device. In another instance, a user could have input an address and asked the device to calculate a route while the device was in an unlocked screen mode. Then, when the user picks up the device, presses a button, swipes the screen, etc. the lock screen could illuminate displaying the map information to allow the user to view the map and directions without unlocking the device.

In one embodiment, a method of automatically illuminating a device screen is disclosed. A gyroscope and/or accelerometer could detect an action indicating that a user just pulled the device from a pocket or purse and automatically illuminates or displays information on a lock screen to "wakes up" the device. For example, a non-illuminated device or a device in a power saving mode could be "woken up" when a particular action is detected that suggests that the user is going to engage the device, such as by lifting the device and angling it in a position for viewing. In one instance, a light sensor could be used instead of or in addition to the gyroscope and/or accelerometer to determine a user's readiness to engage the device 302. For example, the device could remain "asleep" in the dark and be "woken up" when the light sensor detects light such as when a user pulls the device out of a purse or pocket. In another embodiment, a camera of the device could utilize facial recognition technology to know whether a user is facing or looking at the device to illuminate. The above embodiments could also be extended to other device modes and is by no means limited to a lock-screen mode.

Accordingly, a user could choose many different category feeds and/or applications to have displayed on a lock screen, such as lock screen 300, 400, 500, 600, and others. For example, the music application discussed above with respect to FIG. 1 could be used on the lock screen. In this example, when the device detects an action indicating that the user pulled the device from a pocket or purse, the screen could be illuminated with the artist and title track waiting for the user to view in the event music is playing in the background. As described above, the application can selectively be in a constant listening mode, or a listening mode when activated by a gyroscope or accelerometer, to identify music playing in the background or within ear-shot of the device. In other examples, the lock screen application could be static, such as a stock ticker or a news flash that does not include additional functionality.

As noted above, various embodiments of the present disclosure provide methods of providing location based services to a user. For example, FIG. 7 illustrates an example method 700 for offering location based applications on a computing device in accordance with various embodiments. It should be understood that, for any process discussed herein, there can be additional, fewer, or alternative steps performed in similar or alternative orders, or in parallel, within the scope of the various embodiments unless otherwise stated. In addition, steps of the method 700 (or any method, combination of methods or portions of methods described herein) may be performed under the control of one or more computer systems configured with executable instructions. Further, computer systems may include appropriate components operable to perform steps of the methods. In addition, as evident from context, some steps, such as steps involving the collection of data, may not be discrete steps in the sense that they are begun and completed before proceeding to the next step, but may be performed while other steps are being performed, and may be performed continuously throughout performance of the method.

In this example, a plurality of applications are made available for display on a portable computing device 702. Each application is able to display a certain type of information. Generally, a method for providing location based applications includes receiving GPS data and, based upon certain criteria, causing the certain information to be displayed. Therefore, a system monitors and collects data information of the user of the portable computing device to learn the user's habits and preferences 704. In this example, data associated with a geographic location of the portable computing device is received 706. While the present disclosure discusses GPS, it should be understood that any type of data relevant to locations may be used, and that the data does not necessarily need to be GPS data, which typically comprises geographic coordinates of locations. For example, the data may include addresses or other information identifying places. The data may include additional data that identifies other relevant information also, such as the time of day a user arrived at a particular location and the duration of the user's stay at the location, and the frequency at which the user visits the location. In an embodiment this other relevant information may be calculated using GPS data received or it may be calculated before receipt, such as by the user's portable computing device. The GPS data may be received incrementally as the user travels from place to place, or may be collected by the user and/or another entity and received in a batch process at a scheduled and/or convenient time.

In this example, an application, or functionality associated with one or more applications such as a web browser, for example, is selected for display 708. The application or functionality includes information that corresponds to the geographic location and/or the user's habits. The information is then displayed on the portable computing device 710. In some embodiments, different types of functionality can be enabled 712 based on whether the portable computing device is in a locked screen mode or an unlocked screen mode. If the device is in an unlocked mode, the information could be displayed in the local feed 110 of FIG. 1, for example. The information could be with respect to a local business and the enabled functionality could be to click on the notification 112 to receive additional information. The additional information could include a map and/or directions to the location of the business, customer reviews, and so on while other device functions are enabled. If the device is in a locked mode, the enabled functionality could be to perform an action to access additional information on the displayed information or no additional functionality may be enabled. The information could be a notification or suggestion to try a restaurant in close proximity, as described in FIG. 5, for example. In this example, the user could perform an action to unlock functionality with respect to the displayed information about the restaurant while keeping other device functionality in a locked screen mode.

In various embodiments, the user's location may also be determined using information, messages, or notes the user has sent, posted, or created. For example, the user could create a calendar event to see Mount Rushmore the next day and the device could safely interpret that as evidence that the user will be in South Dakota tomorrow seeing Mount Rushmore. The user could also post a message on Facebook®, Twitter®, and the like including a hashtag for an internet relay chat (IRC) network such as # Los Angeles or # Staples Center and the device could interpret this as either the user is in Los Angeles or the user may be interested in information about Los Angeles that is relevant to the user's interests, preferences, or habits.

In order to provide the most relevant information, the device or service provider system may collect various types of user data from various applications or services provided on or to the device. The data may include data relevant to the user's consumption, such as items he or she has purchased or otherwise consumed, websites he/she has visited on the device, advertisements that have been shown to the user, demographic data about the user, and other relevant data. Such data may be gathered from various sources, such as from one or more online merchants. The data may also be provided by the user him/herself. For example, the user may input his/her demographic data and/or other relevant information such as preferences, interests, etc. In various embodiments, the user may specify what kind of information may be collected and used.

In order to properly match a user's preferences and habits, information relevant to various businesses may be stored and accessible by the device or service. The information may include categorization information of the business, which may categorize the business based at least in part on products, services, or other items, location of the business, and generally any other information relevant to the business. Attributes of the businesses may be obtained in various ways. For example, businesses may provide the attributes directly, micro-work or other human-based information gathering methods may be utilized, websites and published catalogs of businesses may be analyzed, and the like.

Identification of businesses having similar attributes may also be performed. In one instance, the data records for businesses can be stored in a data store such that attributes for the business are stored in the data records. The attributes may be selected from a categorization of businesses, which may or may not be hierarchical. For example, a record for a first business may have attributes stored as "restaurant," "inexpensive," and "sandwiches," where "restaurant" is chosen from a plurality of categories such as "hardware store," "grocery store," "movie theater," "convenience store," and the like. The attribute of "inexpensive" may be chosen from a plurality of categories for the "restaurant" category that also include "moderately expensive" and "expensive." Likewise, the attribute "sandwiches" may be chosen from a plurality of categories for the "restaurant" category that also include "chicken," "hamburgers," "pizza," "Chinese," "Mexican," "BBQ," and the like. As appropriate, more than one attribute from a particular category may be included in a data record. For example, a data record for a fast food restaurant that sells a lot of chicken items and a lot of hamburger items may include both the "chicken" and "hamburger" attributes.

Accordingly, in various embodiments, a business with similar attributes can be suggested to a user by identifying a set of attributes that are similar or identical. For example, if a business the user frequents has information stored that corresponds to data that includes "restaurant," "inexpensive," and "BBQ" attributes, a business whose data record also includes those attributes may be identified. Further, all attributes need not match. For example, continuing with the same example, a business only having "restaurant" and "inexpensive" attributes, but not a "BBQ" attribute may be selected. In an embodiment, a plurality of businesses are scored according to the number of attributes that match the business whose pin is stored, and the business or businesses having the score or scores most indicative of being similar to the business whose pin is stored is/are identified. Elements going into the scores may be weighted. For example, hierarchically organized attributes may be weighted such that matches between children attributes in the hierarchy indicate similarity more strongly than matches between parent attributes. Generally, however, any suitable way of identifying the business with similar attributes may be used. For example, in an embodiment, a business may pay a fee or provide other consideration in order to be identified when pins for competitors are identified. As another example, data related to other consumers who have visited a business may be used in order to determine other businesses frequented by the other consumers. In this manner, determinations may be made that people who enjoy one business also enjoy other particular businesses.

Both consumption history of other users and attributes for businesses may be used together to provide effective real-time location based suggestions. Discounts, coupons, or other items may be included in a suggestion. Suggestions may also be interactive and include interface elements such as an element that allows the user to select the elements in order to get directions to the suggested business. Additionally, other ways of providing location based suggestions may also be practiced in addition to or as an alternative to providing suggestions on the user's device. Examples include sending an email or regular mail to the user, directing online advertisements to the user, and the like.

FIGS. 8A and 8B illustrate front and back view respectively of an example portable computing device 800 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others.

In this example, the portable computing device 800 has a display screen 802 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 810 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 804 on the "front" of the device and one image capture element 812 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infra-red sensor, or can utilize another image capturing technology.

The portable computing device can also include at least one microphone 806 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 800 in this example also includes at least one motion- or position-determining element 808 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 814, such as may include at least one wired or wireless component operable to communicate with one or more portable computing devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In order to provide functionality such as that described with respect to FIGS. 8A and 8B, FIG. 9 illustrates an example set of basic components of an portable computing device 900, such as the device 800 described with respect to FIGS. 8A and 8B. In this example, the device includes at least one processor 902 for executing instructions that can be stored in at least one memory device or element 904. As would be apparent to one of ordinary skill in the art, the device can include many types of memory, data storage or computer-readable storage media, such as a first data storage for program instructions for execution by the processor 902, the same or separate storage can be used for images or data, a removable storage memory can be available for sharing information with other devices, etc.

The device typically will include some type of display element 906, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 908, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device, in many embodiments, will include at least one audio element 910, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device.

The device can include at least one additional input device 912 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 914 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 916 known in the art for providing power to an portable computing device, which can include capacitive charging elements for use with a power pad or similar device as discussed elsewhere herein. The example device also can include at least one touch- and/or pressure-sensitive element 918, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes. Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. For example, the portable computing device could stop receiving geographic location data when the battery drops below a predetermined power level or charge threshold. The predetermined level could be, for example, below 25% full, depending on battery capacity, efficiency, and the like, but could be higher or lower in various embodiments. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 10:
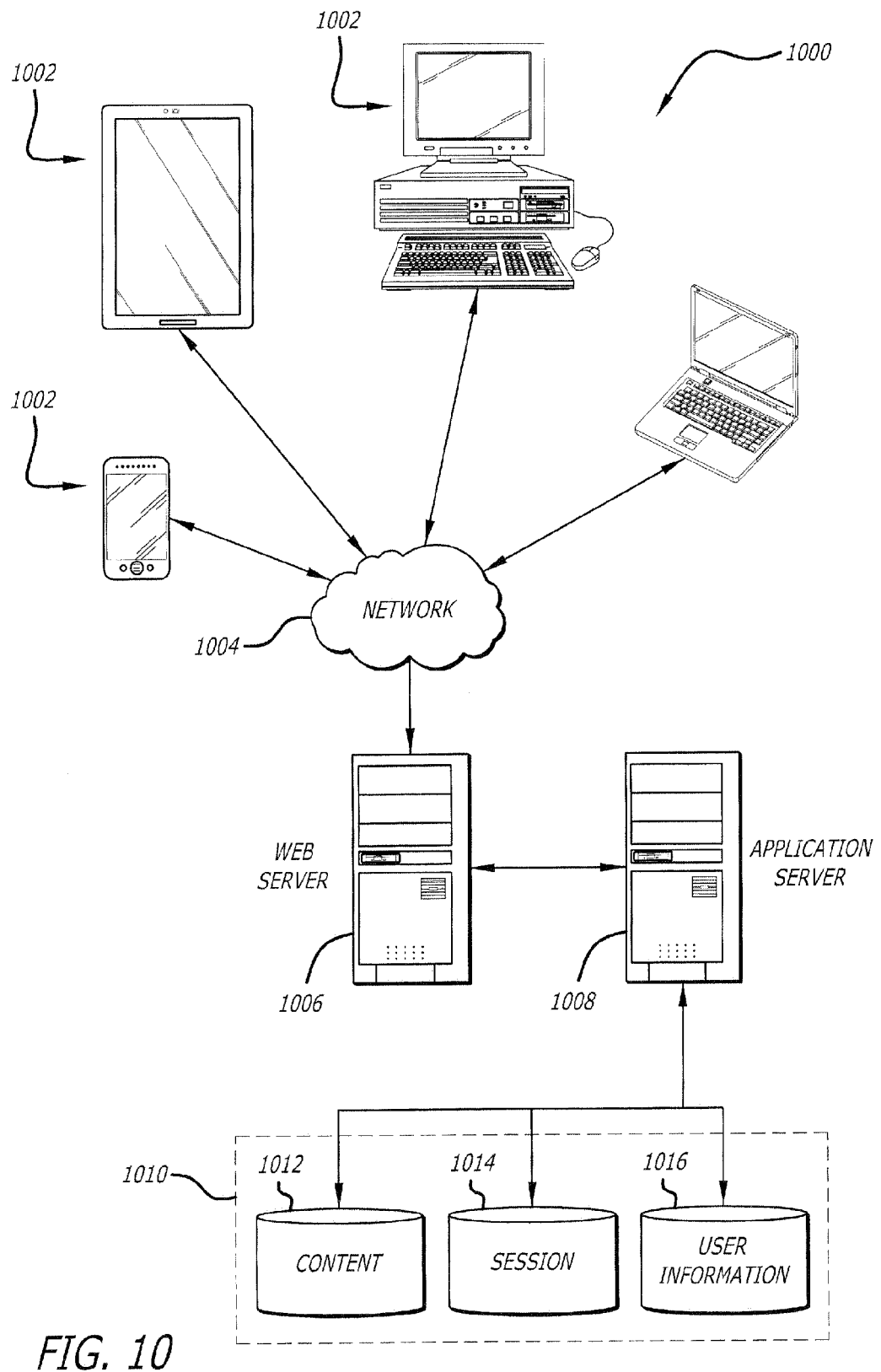
FIG. 10 illustrates an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

What is claimed is:

1. A computer-implemented method comprising:
   under control of one or more computer systems configured with executable instructions,
   obtaining user data corresponding to a plurality of applications provided on a portable computing device to determine one or more patterns of behavior associated with the plurality of applications;
   determining, based at least in part upon the one or more patterns of behavior associated with the plurality of applications, a first set of applications installed on the portable computing device that are relevant to a first location;
   determining the portable computing device is in a locked mode in the first location;
   displaying on a home screen of the portable computing device at the first location, information obtained from a first application of the first set of applications relevant to the first location, the displayed information being obtained from the first application based on the locked mode of the portable computing device;
   determining that a battery level of the portable computing device is above a predetermined threshold, and wherein the portable computing device does not receive the information obtained from the first application when the battery level is below the predetermined threshold; and
   unlocking access to additional information related to the displayed information while keeping other device functionality related to the plurality of applications on the portable computing device in a locked state.

2. The computer-implemented method of claim 1, further comprising:
   determining movement of the portable computing device from the first location to a second location;
   determining, based at least in part upon the one or more patterns of behavior associated with the plurality of applications, a second set of applications installed on the portable computing device that are relevant to the second location; and displaying concurrently on the home screen at the second location, the second set of applications on the home screen, second information obtained from a second application of the second set of applications, the second information being displayed based on the locked mode of the portable computing device.

3. The computer-implemented method of claim 2, further comprising:

while the portable computing device operates in the locked mode, receiving an input to access a second set of applications.

4. The computer-implemented method of claim 1, further comprising:

receiving a touch gesture input on the displayed information on the home screen.

5. The computer-implemented method of claim 2, further comprising obtaining information relevant to at least one of the first location or the second location, the information including at least one of a news item, a notification of close proximity to a point of interest, a notification of close proximity to a location a user frequents, or a weather notification.

6. The computer-implemented method of claim 5, wherein the plurality of applications includes a social networking application and wherein the information relevant to at least one of the first location or the second location includes a notification that at least one person associated through the social networking application is located in close proximity.

7. A computer-implemented method comprising:

under control of one or more computer systems configured with executable instructions, obtaining user data corresponding to a plurality of applications provided on a portable computing device to determine one or more patterns of behavior associated with the plurality of applications;

obtaining first location data for the portable computing device;

determining a location-type associated with the first location data;

determining, based at least in part on the location-type and the one or more patterns of behavior associated with the plurality of applications, a first set of applications to display on a home screen of the portable computing device;

determining the portable computing device is in a locked mode;

displaying on the home screen, information obtained from a first application of the first set of applications, the first set of applications including location-specific content corresponding to the first location data;

determining that a battery level of the portable computing device is above a predetermined threshold, and wherein the portable computing device does not receive the information obtained from the first application when the battery level is below the predetermined threshold; and unlocking access to additional information related to the displayed information while keeping other device functionality related to the plurality of applications on the portable computing device in a locked state.

8. The computer-implemented method of claim 7, further comprising:

obtaining second location data for the portable computing device;

determining the location-type associated with the second location data;

determining, based at least in part on the location-type and the one or more patterns of behavior associated with the plurality of applications, a second set of applications to display on the home screen of the portable computing device;

displaying concurrently on the home screen, information obtained from two or more applications selected from the second set of applications on the portable computing device, the second set of applications including location-specific content corresponding to the second location data;

retrieving data associated with the first location data and the second location data from a remote server; and obtaining at least one of additional information or a modified functionality for the portable computing device, the additional information and the modified functionality being associated with the location-type.

9. The computer-implemented method of claim 7, further comprising:

determining a level of relevance of the location-specific content based at least in part on the first location data, the first location data being determined using at least one of global positioning system (GPS) data, an Internet Protocol (IP) address, or signal triangulation data.

10. The computer-implemented method of claim 7, wherein the information corresponding to the location-type associated with the first location data includes at least one of a news item, information for an establishment located near the first location data, a notification of close proximity to a point of interest, a notification of close proximity to a location a user frequents, or a weather notification.

11. The computer-implemented method of claim 8, further comprising:

determining a type of functionality for the portable computing device, the type of functionality corresponding to a locked mode and an unlocked mode, wherein the type of functionality corresponds to the locked mode and wherein at least one of the additional information or the modified functionality is obtained without changing the type of functionality to corresponding to the unlocked mode, the additional information or the modified functionality being obtained by at least one of tapping, shaking, speaking, or providing a touch gesture to the portable computing device.

12. The computer-implemented method of claim 11, wherein the type of functionality corresponds to the unlocked mode and wherein the additional information includes at least one or more of image information, audio information, textual information, or video information.

13. The computer-implemented method of claim 8, wherein the additional information and the modified functionality are obtained through one or more of an application or a widget executed on the portable computing device.

14. The computer-implemented method of claim 13, wherein the additional information and the modified functionality are obtained through the corresponding application or widget.

15. A portable computing device, comprising:

a processor;

a display screen; and a memory device including instructions that when executed by the processor, cause the portable computing device to:

obtain user data corresponding to a plurality of applications provided on a portable computing device to determine one or more patterns of behavior associated with the plurality of applications;

obtain first location data for the portable computing device;

determine a location-type associated with the first location data;

determine, based at least in part on the location-type and the one or more patterns of behavior associated with the plurality of applications, a first set of applications to display on a home screen of the portable computing device;

determine the portable computing device is in a locked mode;

display on the display screen, information obtained from a first application of the first set of applications including location-specific content associated with the first location data, the portable computing device being configured to display at least a portion of the location-specific content on the home screen;

determine that a battery level of the portable computing device is above a predetermined threshold, and wherein the portable computing device does not receive the information obtained from the first application when the battery level is below the predetermined threshold; and unlock access to additional information related to the displayed information while keeping other device functionality related to the plurality of applications on the portable computing device in a locked state.

16. The computing device of claim 15, wherein the instructions, when executed by the processor, further cause the computing device to:

obtain second location data for the portable computing device;

determine the location-type associated with the second location data;

determine, based at least in part on the location-type and the one or more patterns of behavior associated with the plurality of applications, a second set of applications to display on the home screen of the portable computing device;

concurrently display information obtained from two or more applications selected from the second set of applications on the portable computing device, the second set of applications including location-specific content corresponding to the second location data; and obtain at least one of additional information or modified functionality for the portable computing device, the additional information and the modified functionality being associated with the location type.

17. The computing device of claim 16, wherein the additional information includes at least one of a news item, information for an establishment located near the location type, a notification of close proximity to a point of interest, a notification of close proximity to a location a user frequents, or a weather notification.

18. The computing device of claim 15, wherein the instructions, when executed by the processor, further cause the computing device to:

determine a level of relevance of the location-specific content based at least in part on one or more user preferences.

19. The computing device of claim 16, wherein the instructions, when executed by the processor, further cause the computing device to:

determine a type of functionality for the portable computing device, the type of functionality corresponding to a locked mode and an unlocked mode, wherein the type of functionality corresponds to the locked mode and wherein at least one of the additional information or the modified functionality is obtained without modifying the type of functionality to corresponding to the unlocked mode.

20. The computing device of claim 16, wherein at least one of the location-specific content or the modified functionality obtained through an application executed on the portable computing device or by sending a message to the application executed on the portable computing device.

21. A non-transitory computer-readable storage medium storing instructions that, when executed by a processor of a portable computing device, cause the portable computing device to:

obtain user data corresponding to a plurality of applications provided on the portable computing device to determine one or more patterns of behavior associated with the plurality of applications;

obtain location data for the portable computing device;

determine a location type associated with the location data;

determine, based at least in part on the location-type and the one or more patterns of behavior associated with the plurality of applications, a set of applications to display on a home screen of the portable computing device;

determine the portable computing device is in a locked mode in the first location;

display, at the location type, on the home screen, information obtained from a first application of the set of applications;

provide, via the set of applications, information related to the location type, the information being provided based at least in part upon the determination of the type of functionality for the portable computing device;

determine that a battery level of the portable computing device is above a predetermined threshold, and wherein the portable computing device does not receive the information obtained from the first application when the battery level is below the predetermined threshold; and unlock access to additional information related to the displayed information while keeping other device functionality related to the set of applications on the portable computing device in a locked state.

22. The non-transitory computer-readable storage medium of claim 21, wherein the instructions when executed by the processor further cause the portable computing device to:

determine a level of relevance of at least one of the information related to the location type or the functionality associated with the location type based at least in part on the location data, the location data being obtained using at least one of global positioning system (GPS) data, an Internet Protocol (IP) address, or signal triangulation data.

23. The non-transitory computer-readable storage medium of claim 21, wherein the type of functionality corresponds to the locked mode and wherein at least one of the information related to the location type or the functionality associated with the location type is obtained without changing the type of functionality to corresponding to the unlocked mode, and wherein the information includes at least one of digital image information, audio information, textual information, or video information.

24. The non-transitory computer-readable storage medium of claim 21, wherein the portable computing device stops receiving the location data when a battery of the portable computing device drops below a predetermined level.

\* \* \* \* \*